(12) United States Patent
Ohnuki et al.

(10) Patent No.: US 8,732,550 B2
(45) Date of Patent: May 20, 2014

(54) PROCESSOR AND ERROR CORRECTING METHOD

(75) Inventors: Yoshiteru Ohnuki, Kawasaki (JP); Hideo Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 397 days.

(21) Appl. No.: 12/633,079

(22) Filed: Dec. 8, 2009

(65) Prior Publication Data

US 2010/0088572 A1    Apr. 8, 2010

Related U.S. Application Data

(63) Continuation of application No. PCT/JP2007/062109, filed on Jun. 15, 2007.

(51) Int. Cl.
*G06F 11/00* (2006.01)

(52) U.S. Cl.
USPC .......................... 714/764; 714/755

(58) Field of Classification Search
USPC ......................... 714/764, 785, 755
See application file for complete search history.

(56) References Cited

U.S. PATENT DOCUMENTS

| | | | |
|---|---|---|---|
| 5,689,727 A | 11/1997 | Bonke et al. | |
| 5,996,105 A * | 11/1999 | Zook | 714/755 |
| 6,421,805 B1 | 7/2002 | McAuliffe | |
| 6,487,686 B1 * | 11/2002 | Yamazaki et al. | 714/703 |
| 6,941,489 B2 * | 9/2005 | DeLano | 714/10 |
| 7,107,510 B2 * | 9/2006 | Katoh et al. | 714/785 |
| 7,447,941 B2 * | 11/2008 | Naffziger et al. | 714/12 |
| 8,363,278 B2 * | 1/2013 | Liu et al. | 358/3.03 |
| 2003/0126415 A1 | 7/2003 | Okawa et al. | |
| 2008/0104487 A1 * | 5/2008 | Usui | 714/785 |
| 2008/0141099 A1 * | 6/2008 | Katoh et al. | 714/758 |

FOREIGN PATENT DOCUMENTS

| | | |
|---|---|---|
| EP | 0 655 686 | 5/1995 |
| JP | 62-125453 | 6/1987 |
| JP | 03-105630 | 2/1991 |
| JP | 03-105630 | 5/1991 |
| JP | 05-20215 | 1/1993 |
| JP | 05-120155 | 5/1993 |
| JP | 9-134314 | 5/1997 |
| JP | 2003-196086 | 7/2003 |

OTHER PUBLICATIONS

International Search Report for PCT/JP2007/062109, mailed Aug. 14, 2007.
European Search Report for corresponding European Application 07745364.5-2224; dated Mar. 31, 2011.
Japanese Office Action dated Jan. 31, 2012 for corresponding Japanese corresponding Patent Application No. 2009-519121.
Japanese Office Action mailed Jun. 12, 2012 issued in corresponding Japanese Patent Application No. 2009-519121.

* cited by examiner

*Primary Examiner* — Bryce Bonzo
*Assistant Examiner* — Elmira Mehrmanesh
(74) *Attorney, Agent, or Firm* — Staas & Halsey LLP

(57) ABSTRACT

A processor for processing data and correcting an error occurring in the data, the processor includes: a register that stores data with error check data and error correction data; an error detector that detects an error in the data stored in the register by using the error check data; and an error corrector that corrects the detected error by using the error correction data and that stores the corrected data back into the register.

19 Claims, 8 Drawing Sheets

100

| DATA | PARITY | ECC |
|---|---|---|
| <63:00> | <7:0> | <7:0> |
| 101 | 102 | 103 | ated herein by reference.

PROCESSOR AND ERROR CORRECTING METHOD

CROSS-REFERENCE TO RELATED APPLICATION

This is a continuation of Application PCT/JP2007/062109, filed on Jun. 15, 2007, the entire contents of which are incorporated herein by reference.

FIELD

A certain aspect of the embodiments discussed herein relates to a processor and error correcting method.

BACKGROUND

With increase of the number of transistors mounted in a CPU (Central Processing Unit), there has been a problem in that an error is frequently generated in a register file mounted in the CPU.

Hitherto, it is general to employ a method that detects an error by providing an odd or even parity for every several bit when detecting an error. However, by the method of parity, although an error can be detected, the error can not be corrected. Consequently, when an error is detected when accessing to a register file or the like, it is necessary to re-execute memory access, and this largely affects the performance of the CPU.

Consequently, it has been desired not only to detect an error of data, but also to correct the data in the register file. It is desirable to correct the error by using an ECC data (Error Checking and Correction data).

However, there is a problem in that the processing speed of a CPU is largely reduced when the ECC data is simply replaced instead of the parity data which has been conventionally added to the data in a register file.

Further, there is a patent document described below as for an error correcting method.

[Patent Document 1] Japanese Laid-open Patent Publication No. 05-20215

SUMMARY

According to an aspect of an embodiment, a processor for processing data and correcting an error occurring in the data, the processor includes: a register that stores data with error check data and error correction data; an error detector that detects an error in the data stored in the register by using the error check data; and an error corrector that corrects the detected error by using the error correction data and that stores the corrected data back into the register.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The object of an error correcting method in an embodiment is to improve reliability of a CPU of an information processing apparatus by executing an error correction without lowering a processing speed of the CPU of the information processing apparatus. Specifically, the error correcting method in the present embodiment is provided in a CPU mounted in an information processing apparatus.

Of course, besides a CPU, the error correcting method in the embodiment is a method also provided by an arithmetic circuit such as a DSP (Digital Signal Processor), a GPU (Graphics Processing Unit), a controller LSI, or the like that has a register file and that executes various math calculation, information processing, image processing, or apparatus controlling by a program.

Parity data and ECC data is held with data in a register in a CPU in which a circuit for providing the error correcting method of the embodiment is mounted. Parity data is data for detecting a bit error of data. Further, ECC data is data for correcting the detected error. In the embodiment, both of the parity data and ECC data is data of 8 bit. It is possible for a CPU or the like to execute error detection by using ECC data. However, in the error correcting method in the embodiment, error detection is executed by using parity data, and the detected error is corrected by using ECC data.

First, the CPU executes a reading of data and parity data corresponding to the data, and the CPU determines whether an error is detected in the read data. The CPU performs EOR (Exclusive-OR) operation of the data and the parity data respectively read from the register, and the CPU determines whether the error is detected in the read data. Further, presence or absence of one bit error is detected in the error detection using the parity data.

The CPU ensures validity of the data read from the register. Herewith, the CPU executes detection of an error of data transfer. When the CPU detects one bit error, the CPU temporally interrupts the arithmetic processing being executed. Then, the CPU rereads the data in which the error is detected and read the ECC data corresponding to the data. The CPU corrects the detected one bit error based on the ECC data, and executes a correction of data by writing the data in which an error is corrected in the register.

Herewith, one bit error can be corrected while restraining lowering of the processing speed of the CPU, and the CPU which has a high processing speed and which has high reliability can be provided.

Figure 1:
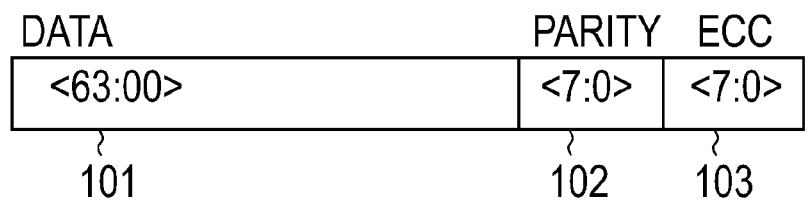
FIG. 1 is a data format of a register file in an embodiment.

FIG. 1 is a data format 100 in the register file in the embodiment. The data format 100 in the embodiment is a unit of data set as one entry of the register file.

The data format 100 is constituted by data 101, parity data 102, ECC data 103. In the embodiment, the data 101 is 64 bit (8 byte), the parity data 102 is 8 bit, and the ECC data 103 is 8 bit, for example.

The parity data 102 is data used for detecting one bit error in the data 101. The ECC data 103 is data used for correcting one bit error that exists in the data 101.

Further, the CPU of the embodiment reads the parity data 102 and the ECC data 103 by using a physically same signal line. Herewith, the CPU can execute an ECC operation and execute an error correction without increasing a signal line. A processing unit that executes arithmetic processing herein may be a unit capable of calculation having a DSP, GPU, controller LSI, or the like except the CPU.

The CPU executes a reading processing or a writing processing of the data of the register file with the unit of a set of the data 101 and the parity data 102, or a set of the data 101 and the ECC data 103. The size of the data format 100 may be a size other than 64 bit (data 101) +8 bit (parity data 102) +8 bit (ECC data), and the data size is not restricted to the size.

Figure 2:
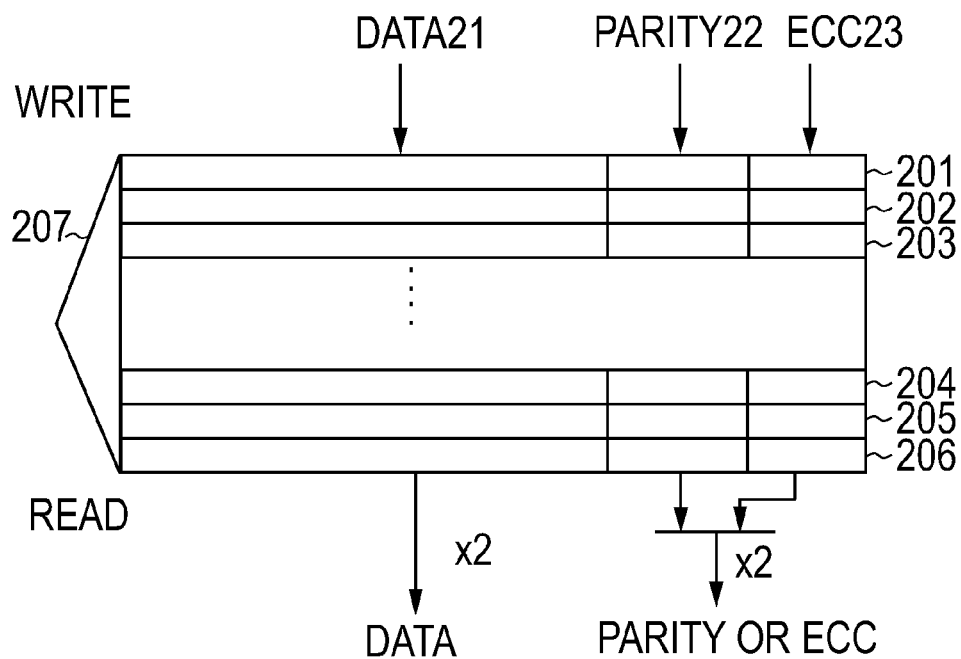
FIG. 2 is a register file 200 in the embodiment.

FIG. 2 is a register file 200 in the embodiment. In the embodiment, the register file 200 is a register file of 2Write-2Read, 8 bytes, and 160 entries. 2Write-2Read is a processing executed by the CPU, and is a reading processing or a writing processing executed by two entry units. The register file 200 stores partial data 201 to 206. The register file 200 includes 160 entries, and in FIG. 2, partial data 201 to 206 is illustrated as a representation. The partial data 201 to 206 are set to an entry of the register file 200 as the data format 100, and the partial data 201 to 206 includes "data 21", "parity data 22", "ECC data 23". One entry is constituted by a block unit in which "data 21", "parity data 22", "ECC data 23" are included. An address 207 illustrates addresses of 160 numbers of e partial data including the partial data 201 to 206 in the register file. The CPU executes a reading processing and a writing processing of desired partial data with reference to the address 207.

The CPU executes a writing processing or a reading processing of the partial data 201 to 206 held in the register file 200 by two entry units. The CPU in which an error correcting mechanism in the embodiment is mounted executes detection of an error and a correction processing of the error in accordance with a correcting flow illustrated as described below.

Figure 3:
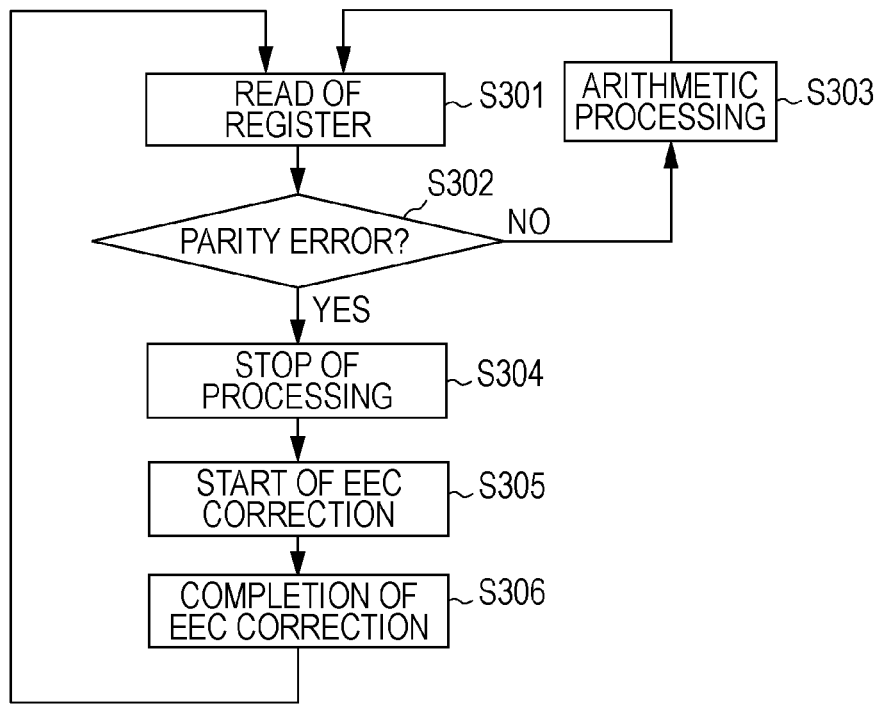
FIG. 3 is a correction flow chart illustrating an error correction in a register file 401 in the embodiment.
Figure 4:
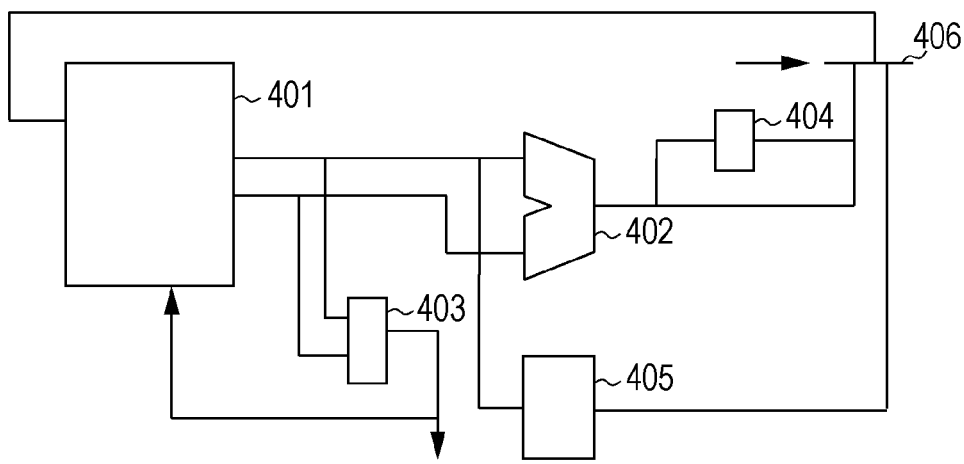
FIG. 4 is a block diagram of an operational circuit 400 in the embodiment.

FIG. 3 is a correction flow chart illustrating an error correction in a register file 401 according to the embodiment. FIG. 4 is a block diagram of an arithmetic circuit 400 indicating the error correcting mechanism according to the embodiment. The arithmetic circuit 400 corresponds to an arithmetic section 707, a register section 708, an error correcting section 709 of FIG. 7 described below. Further, the correction flowchart illustrated in FIG. 3 is a flowchart of the processing provided by the arithmetic circuit 400, and the correction flowchart is related to an error correction in the CPU 700.

The arithmetic circuit 400 described in FIG. 4 includes the register file 401, a processing unit 402, a parity checker 403, an ECC generator circuit 404, and an ECC correction circuit 405.

The register file 401 has the same function and same configuration as the register file 200 illustrated FIG. 2, and the register file 401 stores plurality of partial data. Further, the partial data includes data, parity data, and ECC data.

The processing unit 402 calculates data read from the register file 401. The processing unit 402 is a device that executes a processing such as four arithmetic operations, a logical operation, and the like. Specifically, the processing unit 402 is, for example, an ALU (Arithmetic Logic Unit) and executes integer number math operation (addition, subtraction, multiplication), logical operation (AND, NOT, OR, XOR), bit shift operation for shifting word right (or left) by a specified bit number.

The parity checker 403 executes a parity check of the data and the parity data corresponding to the data read from the register file 401. Error check is executed by performing EOR operation of the data and the parity data for the parity check. The error detected by the parity checker 403 is one bit error.

The ECC generator circuit 404 generates ECC data by using the data of the computation result computed by the processing unit 402. The ECC data generated by the ECC generator circuit 404 corresponds to the data of the computation result.

The ECC correction circuit 405 corrects an error of the data read from the register file 401 detected by the parity checker 403. When an error is detected by the parity checker 403, the processing unit 402 temporally waits the arithmetic processing, and the ECC correction circuit 405 reads the data of the address in which the error is detected and the ECC data corresponding to the data from the register file 401. Then, the error correction circuit 405 corrects the detected error based on the ECC data.

Figure 7:
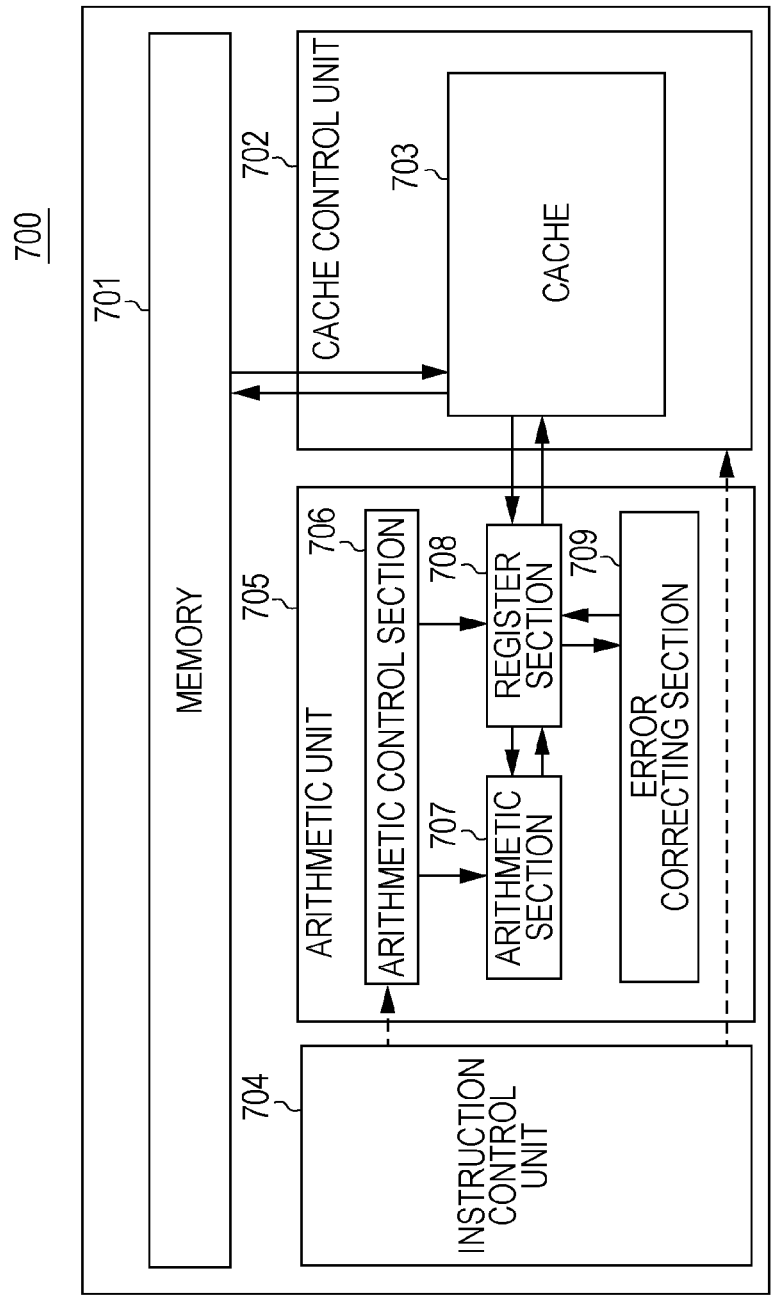
FIG. 7 is a block diagram of a CPU 700 in the embodiment.

A result selection circuit 406 associates the ECC data generated by the ECC generator circuit 404 and the data of the computation result based on the control from an ECC arithmetic control section 706 in FIG. 7, and rewrites the ECC data, the computation result data and the corresponding parity data back into the register file 401.

Next, a correction flowchart in FIG. 3 will be described.

First, the parity checker 403 of the arithmetic circuit 400 reads data and the parity data corresponding to the data from the register file 401 (S301). Then, the parity checker 403 executes a parity check of the read data and the parity data and judges whether or not there is a parity error in the read data (S302). At the time, the processing unit 402 executes arithmetic processing of the data read from the register file 401.

When the parity checker 403 judges that there is no parity error in the data read from the register (S302 NO), the processing unit 402 continues the arithmetic processing (S303).

When the parity checker 403 judges that there is a parity error in the data read from the register (S303 YES), the processing unit 402 temporally stops the arithmetic processing (S304). The ECC correction circuit 405 reads the data in which the parity error is detected and the ECC data corresponding to the data from the register file after a read error of data is detected by the parity checker 403. Then, the ECC correction circuit 405 corrects the parity error of the data read from the register file 401 (S305). Then, the ECC correction circuit 405 completes the error correction (S306). Then, after the data error is corrected by the ECC correction circuit 405, the result selection circuit 406 rewrites the corrected data, and the ECC data and the parity data corresponding to the data back into the register file 401. The processing unit 402 re-executes the processing from the instruction after the error is detected. Further, in the case where the parity checker 403 does not detect an error of the data read from the register file 401, the processing unit 402 executes an arithmetic processing. Then, the ECC generator circuit 404 generates the ECC data and the parity data corresponding to the data of the computation result. Then, the result selection circuit 406 rewrites the data of the computation result, and the ECC data and the parity data generated by the ECC generator circuit 404 in the file register 401.

By executing an error correction in accordance with the aforementioned order and correcting a bit error of the register file 401 only when a parity error is generated, a bit error in the register file 401 is preferably corrected reducing an affect of the processing speed of the CPU in the information processing apparatus.

In the example, the parity checker 403 executes an error detection by performing by a parity check, so that the error which can be detected is one bit error. Of course, an error to be detected may not be one bit error in consideration of the relationship with the processing speed of operation, and an error detecting method for detecting those errors may be used. In the error correcting method in the embodiment, the detecting method and the correcting method of an error are different, and the processing speed of the detecting method of an error is faster than that of the error correcting method.

Figure 5:
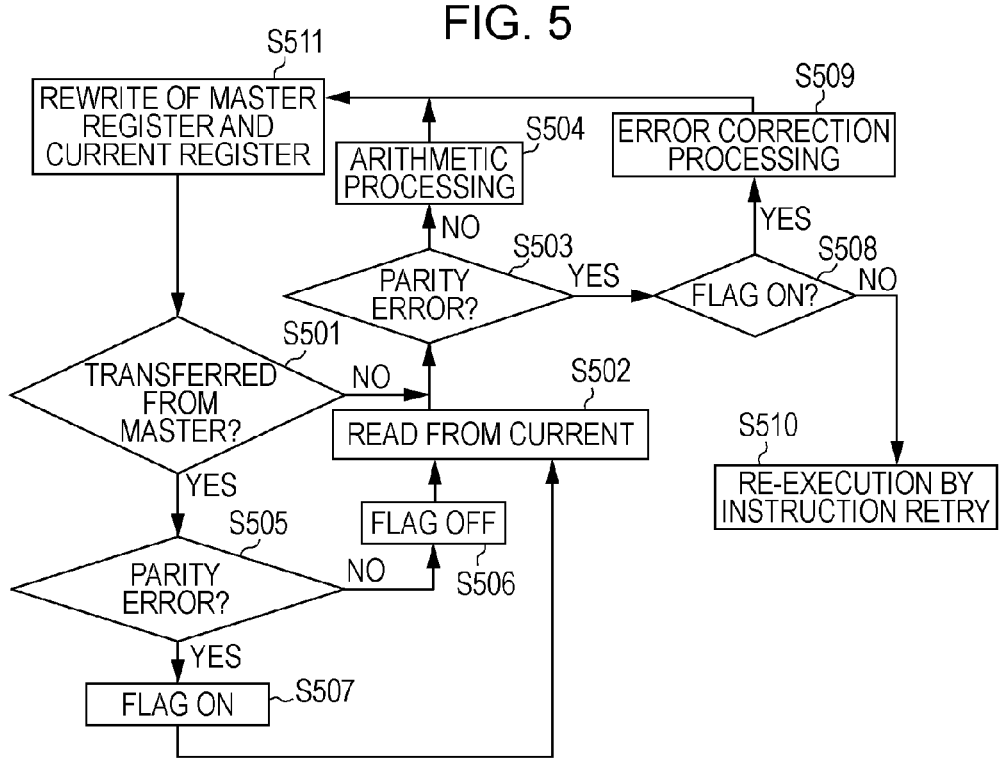
FIG. 5 is a correction flow chart illustrating an error correction in a count register file 602 in the embodiment.

FIG. 5 is a flow chart of an error detection and correction of the register file in the embodiment. The correction flowchart described in FIG. 5 is a processing provided by an arithmetic circuit 600 illustrated in FIG. 6. The error correcting method illustrated in FIG. 5 is a method for detecting and correcting an error of data transfer from a master register file 601 to a current register file 602.

First, the ECC arithmetic control section 706 judges whether or not data and parity data is transferred from the master register file 601 to the current register file 602 depending on a signal from an instruction control unit 704 in FIG. 7 (S501). The master register file 601 is a register file that holds the entire data to be processed by the arithmetic circuit 600, and the current register file 602 is a register file that holds a part of the data handled by the master register file 601. A processing unit 605 executes an arithmetic processing of the data held by the current register file 602.

When the ECC arithmetic control section 706 judges that data transfer from the master register file 601 is not executed (S501 NO), a parity checker 604 judges whether or not there is a parity error of data transferred from the current register file 602 to the processing unit 605 (S503). In the embodiment, the data to be calculated by the processing unit 605 is data held in the current register file 602. The use of the current register file 602 is to improve the processing speed of the arithmetic circuit 600. By executing an arithmetic processing by accessing to the current register file 602 having a holding amount smaller than the master register file 601 by the processing unit 605, the arithmetic circuit 600 can improve the processing speed.

When a parity checker 603 does not detect a parity error in the data transferred to the processing unit 605 (S503 NO), the processing unit 605 continuously executes an arithmetic processing (S504). When a parity error is detected in the data transferred to the processing unit 605 by the parity checker 603 (S503 YES), the instruction control unit 704 judges whether or not an error flag is ON (S508). Herein, the error flag is a flag indicating whether or not a parity error exists in the data transferred from the master register file 601 to the current register file 602. The arithmetic control section 706 holds the error flag. Then, the instruction control unit judges ON/OFF of the error flag held by the arithmetic control section 706.

When the ECC arithmetic control section 706 judges that data transfer from the master register file is executed (S501 YES), the parity checker 603 judges whether or not there is a parity error in the data transferred from the master register file 601 (S505).

When the parity checker 603 detects a parity error in the data transferred from the master register file 601 (S505 YES), the parity checker 603 sets the error flag to ON (S507) and reads data from the current register file 602 (S502). On the other hand, when the parity checker 603 does not detect a parity error in the data transferred from the master register file 601 (S505 NO), the parity checker 603 sets the error flag to OFF (S506), and reads data from the current register file 602 (S502). Herein, the data held by the current register file 602 is data transferred from the master register file 601. The error flag of the data stored in the master register file 601 and the current register file 602 is set to OFF in the initial state. Consequently, the error flag is remained OFF until an error is detected by the parity checker 603.

Then, in S508, when the instruction control unit 704 judges that the error flag is ON (S508 YES), an error correction circuit 606 executes an error correction processing of the data in which an error is detected by the parity checker 603 (S509). Herein, the instruction control unit 704 is a unit that discriminates the ON/OFF state of the error flag held by the instruction control unit 704 and that executes a transfer control of the data and the ECC data corresponding to the error flag. Then, the result selection circuit 608 executes a rewriting processing in the master register file 601 and the current register file 602 (S511). The rewriting processing is a processing executed by the result selection circuit 608, and is a processing of additionally writing or overwriting data, the ECC data corresponding to the data, and the parity data corresponding to the data in the master register file 601 and the current register file 602.

Further, in step S508, when the instruction control unit 704 judges that the error flag is OFF (S508 NO), the processing unit 605 re-executes the arithmetic processing by a retry instruction (S510).

Further, the CPU according to the embodiment includes a buffer called as a CSE (Commit Stack Entry). In the CSE, one entry is assigned for every instruction, and is used for monitoring a progressing state of the instruction being executed. The entry of the CSE is made to be disabled at an instruction commit time when instruction is completed by in-order in accordance with the order of a program instruction.

An update instruction of the CSE involved in an instruction commit is executed by in-order, so that when the instruction execution is interrupted, consistency of programmable resource can be assured at a position indicated by a program counter at the time. Further, the CSE forms a checkpoint for every commit to provide a function of a writing cycle of a pipeline control. Herewith, even when instruction execution is interrupted, it is possible to discard every data remained in the input, output or the like of a working register or the processing unit 605.

The mechanism of error detection and error correction according to the embodiment makes it possible to keep consistency of programmable resource and to provide order retry (order re-execution) even when recovering prediction miss alignment of a branch or generating of interruption. That is, when the parity checker 603 detects a parity error in the data transferred from the master register file 601 to the current register file by an instruction fetch, instruction execution, or the like, the instruction control unit 704 activates a process switch of the CPU to interrupt the instruction execution. The processing is stopped at a checkpoint formed by the CSE. Then, the CSE keeps the resource related to the instruction fetch or the execution, and can re-execute the instruction retry without impairing data integrity when restarted from the address held in the program counter again.

Figure 6:
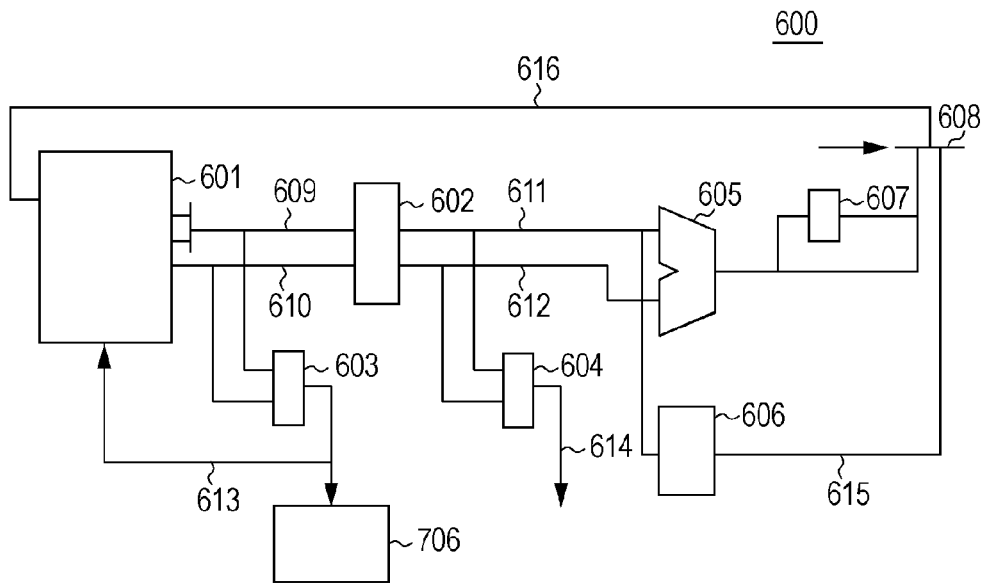
FIG. 6 is a block diagram of an arithmetic circuit 600 in the embodiment.

FIG. 6 is a block diagram of the arithmetic circuit 600 having the register file and the correction circuit of the embodiment.

The arithmetic circuit 600 includes the master register file 601, the current register file 602, the parity checker 603, the parity checker 604, the processing unit 605, the ECC correction circuit 606, and an ECC generator circuit 607.

The master register file 601 and the current register file 602 store a plurality of partial data. The current register file 602 is a register file stores a predetermined number of partial data read from the master register file 601. The master register file 601 is a register file that holds partial data of the entire entry to be processed by the arithmetic circuit 600. The current register file 602 reads data from the master register file 601 at a predetermined timing and executes a data processing. Accordingly, the entry number of the partial data constituting the master register file 601 is larger than the entry number of the partial data constituting the current register file 602. The data processing speed of the arithmetic circuit 600 can be improved by holding the minimum data which is processed in the current register file 602.

Further, the master register file 601 transmits data and parity data (or ECC data) by using signal lines that are physically different from each other. In the embodiment, the master register file 601 transmits parity data or ECC data to the current register file 602 by using a transfer bus 609, and transmits data by using a transfer bus 610. The current register 602 transmits data and parity data to the processing unit 605 and the parity checker 604 by using transmission buses 611, 612. The current register file 602 transmits data and ECC data to the error correction circuit 606 by using the transfer bus 611, and transmits data and parity data to the processing unit 605 and the parity checker 604 by using the transfer bus 612. Further, the current register file 602 transmits data and ECC data to the error correction circuit 606 by using the transfer bus 612.

The parity checker 603 executes a parity check of the partial data read from the master register file 601 to the current register file 602. When a parity error is detected by the parity checker 603, the parity checker 603 sets the error flag ON. Then, the parity checker 603 stores a read address of the data read from the master register file 601 in the current register file 602.

The parity checker 604 is a checker that checks a parity error in an operand data (before arithmetic processing) in the processing unit 605.

The processing unit 605 calculates data read from the current register file 602. The processing unit 605 is a device for executing a processing such as four arithmetic operations, a logical operation, and the like. Specifically, the processing unit 605 is, for example, an ALU (Arithmetic Logic Unit) and executes integer number math operation (addition, subtraction, multiplication), logical operation (AND, NOT, OR, XOR), bit shift operation for shifting word right (or left) by a specified bit number.

The ECC correction circuit 606 is a circuit that corrects an error of the data read from the current register file 602 by using ECC data. The ECC correction circuit 606 reads the ECC data used for error correction from the current register file 602. When an error is detected in the data read from the master register file 601 by the parity checker 603, the instruction control unit 704 temporally waits the processing of transferring data from the master register file 601 to the current register file 602.

The master register file 601 transfers the data in which an error is detected to the current register file 602. The ECC correction circuit 606 reads the data in which an error is detected from the current register file 602. Then, the ECC correction circuit 606 reads the ECC data corresponding to the data in which an error is detected from the current register file 602, and corrects the data in which an error is detected by using the read ECC data. At this time, the ECC correction circuit 606 reads the ECC data from the current register file 602 by using the signal line for reading parity data. Further, the ECC correction circuit 606 corrects the data and generates the parity data corresponding to the data newly corrected.

Then, the result selection circuit 608 rewrites the corrected data, the generated parity data, and the ECC data in the master register file 601.

Further, the ECC generator circuit 607 generates ECC data by using the computation result data obtained by using the data in which an error is not detected by the parity checker 603. The ECC data generated by the ECC generation circuit 607 is ECC data corresponding to the computation result data. Then, the ECC generator circuit 607 rewrites the ECC data generated by the ECC generation circuit 607 and the computation result data corresponding thereto in the master register file 601 based on the control from the ECC arithmetic control section 706. After an error of the data detected by the error correction circuit 606 is corrected, the CPU 700 re-executes the processing from the arithmetic processing of the data in which an error is detected.

In FIG. 6, only the transfer buses 609, 610 are illustrated as a transfer bus for transferring data to the current register file 602 by the master register file 601. The arithmetic circuit 600 has a plurality sets of transfer buses 609, 610 as a transfer bus for connecting the master register file 601 and the current register file 602 although omitted in FIG. 6. Note that, the transfer bus 609 is a transfer bus for transferring parity data or ECC data, and the transfer bus 610 is a transfer bus for transferring data. Then, the master register file 601 respectively transfers parity data, ECC data, and data to the current register file 602 divisionally a plurality of times. For example, when the arithmetic circuit 600 has 8 sets of transfer buses, and data corresponding to 32 registers is transferred from the master register file 601 to the current register file 602, data corresponding to 8 registers is transferred 4 times.

FIG. 7 is a block diagram of the CPU 700 in the embodiment.

The CPU 700 includes a memory 701, a cache control unit 702, the instruction control unit 704, and an arithmetic unit 705. The cache control unit 702 includes a cache 703. Further, the arithmetic unit 705 includes the arithmetic control section 706, the arithmetic section 707, the register section 708, and an error correcting section 709.

The memory 701 is a storage unit that holds data. The memory 701 holds the entire data handled by the CPU. The cache control unit 702 controls communication of data between the memory 701 and the cache 703. The cache control unit 702 specifies a predetermined address of the memory 701, reads desired data, and stores the read data in the cache 703 at a predetermined address. Similarly, the cache control unit 702 specifies a predetermined address in the cache 703, reads desired data, and stores the read data in the memory 701 at a predetermined address.

Then, the cache control unit 702 also controls communication of data between the cache 703 and the register section 708. The cache control unit 702 specifies a predetermined address of the cache 703, reads desired data, and stores the read data in the register section 708 at a predetermined address. Similarly, the cache control unit 702 specifies a predetermined address in the register section 708, reads desired data, and stores the read data in the cache 703 at a predetermined address. In the embodiment, the cache function is provided by the one cache 703. However, in order to speed up the processing, the cache function may include a plurality of caches, for example, of a first cache and a second cache. The register section 708 provides a function that is provided by the register file 401 in FIG. 4, the register file 601 in FIG. 6, or the like.

The arithmetic control section 706 controls the integral processing of the arithmetic unit 705 by controlling the arithmetic section 707 and the register section 708. The arithmetic section 707 executes a reading processing of data from the register section 708 and a writing processing of data in the register section 708 based on an instruction from the arithmetic control section 706. Further, the error correcting section 709 executes a correction processing of an error of the data in the case where there is an error in the data stored in the register section 708. Detection of an error corrected by the error correcting section 709 is executed by the register section 708. The arithmetic section 707 reads data and the parity data corresponding to the data from the register section 708. The register section 708 tries detection of an error in data in the reading processing, the writing processing, or the like of data based on data and parity data. The parity check is a method for detecting an error of data in data communication. Even or odd of the number of one or zero of a bit constituting data is compared with parity data. When the compared results are not matched, it is judged that there is an error in the data.

The error correcting section 709 reads the data in which an error is detected and the ECC data corresponding to the data from the register section 708.

The CPU 700 in the embodiment generates a syndrome of 8 bit for obtaining a bit error position from input data of 64 bit and parity data of 8 bit via an EOR arithmetic circuit.

Further, the processing speed of the CPU 700 can be improved by pipelining the processing executed by the CPU.

In order to correct one bit error detected based on parity data by the parity checkers 603, 604, the error correcting section 709 generates a correction mask of 64 bit. The error correcting section 709 generates each bit of the correction mask based on the result of the syndrome. If one bit error is detected by the parity checkers 603, 604, the error correcting section 709 masks out the bit except error bit by using the correction mask to correct the error.

Figure 8:
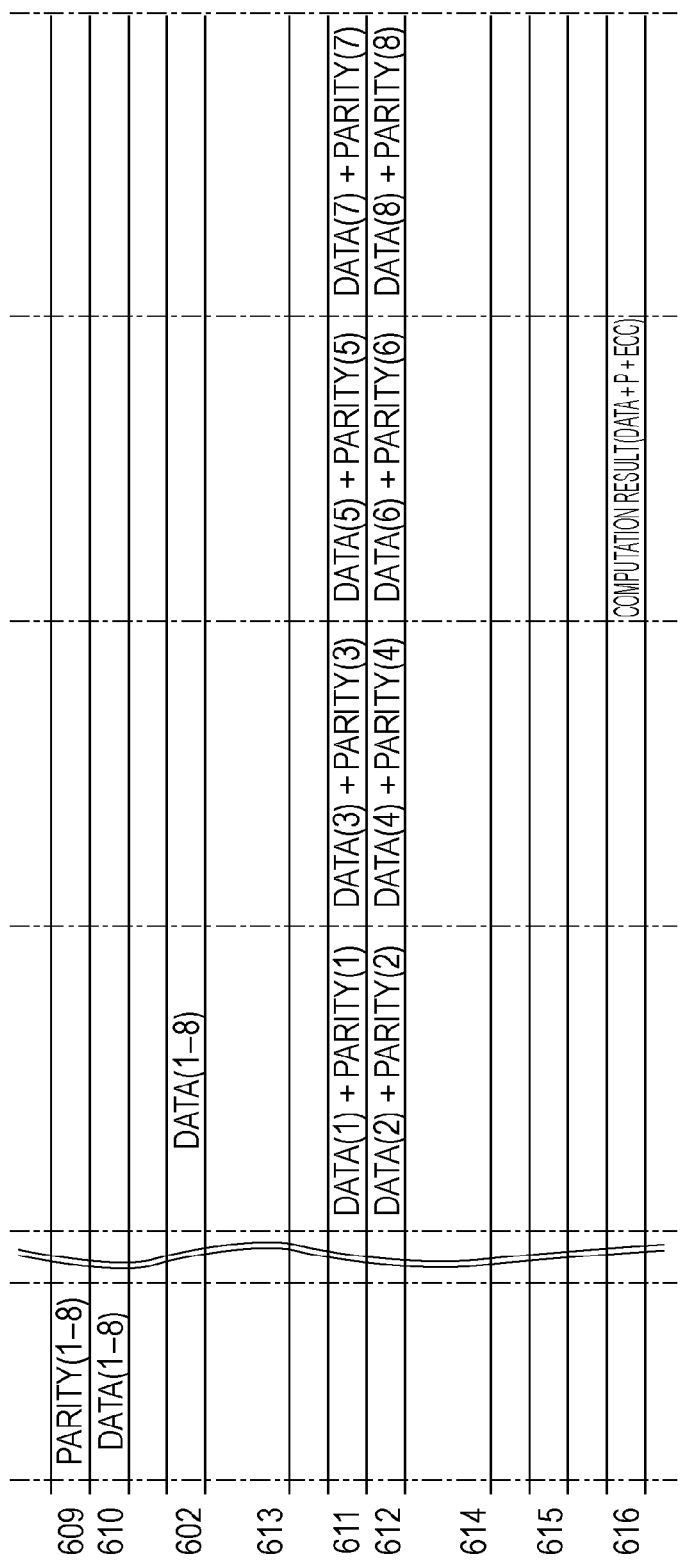
FIG. 8 is a timing chart of the CPU 700 in the embodiment.
Figure 9:
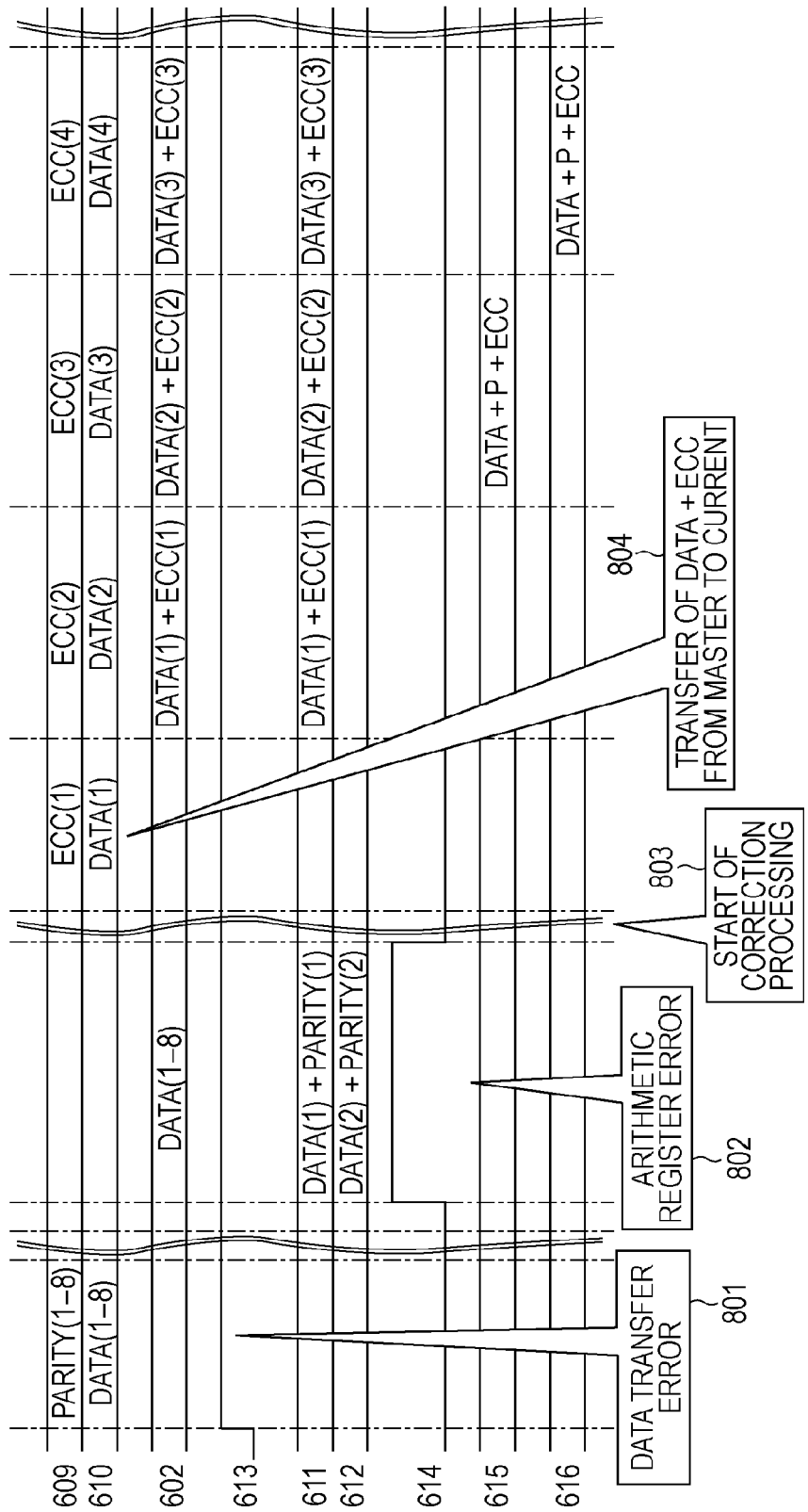
FIG. 9 is a timing chart of the CPU 700 in the embodiment.
Figure 10:
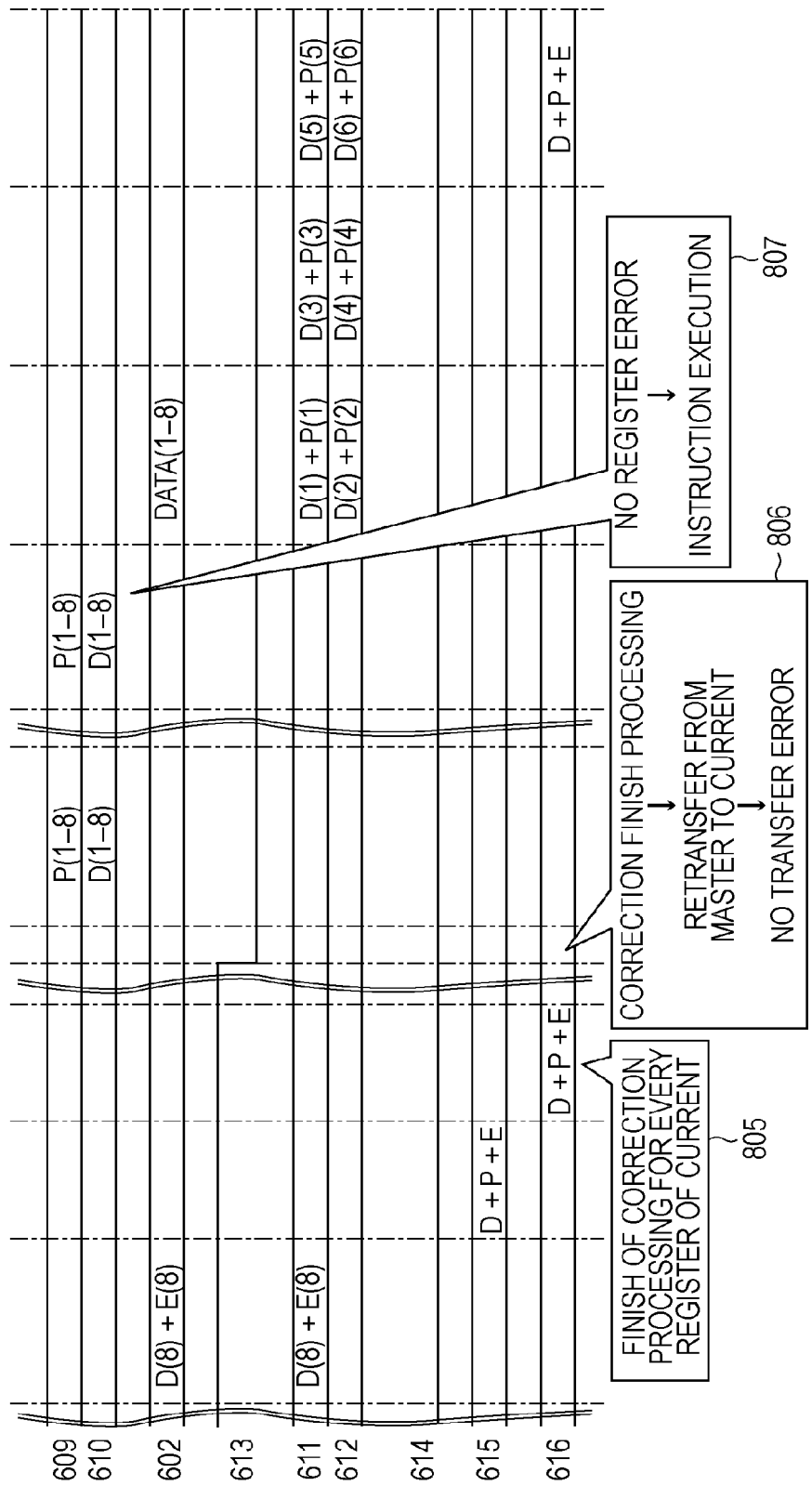
FIG. 10 is a timing chart of the CPU 700 in the embodiment.

FIGS. 8, 9, 10 are timing charts of a processing of the CPU in the embodiment.

In the error correction of data executed by the CPU 700, it is desirable that the parity check and the correction processing of the error detected by the parity check by using ECC data can be executed within a time of the reading processing of data from the register unit 708. However, it is difficult that the ECC error correction processing is executed within a predetermined time by the CPU 700 when a delay such as the data reading processing is frequently occurred.

Further, CPU processing speed is lowered by assuring the time for executing error check, error correction of partial data by using ECC data from the data reading processing.

Consequently, the CPU 700 according the embodiment checks presence or absence of a parity error of the data held in the register section 708 by using parity data. Then, the CPU 700 corrects the error detected by the parity check by using ECC data. Herewith, even when it takes a several hundred τ in the error correction processing to correct an error by the CPU, it is a small amount of time when compared with the entire processing time, and error correction can be provided without lowering the processing performance of the CPU 700.

In the timing charts of FIGS. 8, 9, 10, the CPU executes a normal processing and executes a parity check of data by using the data and the parity data corresponding to the data. "PARITY (1 to 8)", "DATA (1 to 8)" described in FIGS. 8, 9, 10 are generic names of data, parity data of a block unit of data of 8 byte and parity data of 8 bit corresponding to the data, respectively. Further, "DATA (1)", "PARITY(1)" indicates data of 8 byte, parity data of 8 bit, respectively. Similarly, "DATA(n)", "PARITY(n)" in which another number n is attached are also data of 8 byte, parity data of 8 bit. Herein, "n" in the embodiment is a natural number of 1 to 8. Of course, "n" may be a natural number not less than 8, and the constitution may be employed in which the CPU can transfer more data and parity data at once.

FIG. 8 is a timing chart when the parity checker 603 does not detect an error (hereinafter, this case is referred to as normal time). In the normal time, the master register file 601 collectively transfers 8 bit of parity data (described as PARITY (1) in FIG. 8) to the current register file 602 via the transfer bus 609. Herein, there are 8 sets of the transfer bus 609 and the transfer bus 610 between the master register file 601 and the current register file 602. In FIG. 6, illustration of the 8 sets of transfer buses are omitted. That is, one bit of parity data and one bite of data is transferred for every set of each transfer bus (transfer bus 609 and transfer bus 610). Further, the master register file 601 correctively transfers data (described as DATA(1) in FIG. 8) of 8 byte to the current register file 602 via the transfer bus 610. The current register 602 transfers data of 8 byte and the corresponding parity data of 8 bit (described as DATA(1)+PARITY(1) or the like in FIG. 8) to the processing unit 605 via the transfer bus 611. Similarly, the current register 602 transfers data of 8 byte and the corresponding parity data of 8 bit (described as DATA(2)+PARITY (2) or the like in FIG. 8) to the processing unit 605 via the transfer bus 612. The processing unit 605 rewrites the calculated computation result (described as computation result (DATA+P+ECC) in FIG. 8) in the master register file 606 via a transfer bus 616.

FIG. 9 is a timing chart when the parity checker 603 detects an error. The master register file 601 collectively transfers parity data (described as PARITY (1 to 8) in FIG. 9) of 8 bit to the current register file 602 via the transfer bus 609. Further, the master register file 601 collectively transfers data (described as DATA (1 to 8) in FIG. 9) of 8 byte to the current register file 602 via the transfer bus 610.

Then, assuming that a transfer error of DATA (1) is generated in a cycle 801. When the transfer error is generated, the parity checker 603 notifies the master register file 601 of the generation of the transfer error via a transfer bus 613. Further, assuming that a register error is generated in a cycle 802. When the arithmetic register error is generated, the parity checker 604 notifies the arithmetic control section 706 of the generation of the arithmetic register error via a transfer bus 614.

In a cycle 803, the arithmetic circuit 600 starts a correction processing. The master register file 601 notifies the current register file 602 of ECC data (described as ECC(1) or the like in FIG. 9) via the transfer bus 609. Further, the master register file 601 transfers data (described as DATA(1) or the like in FIG. 9) to the current register file 602 via the transfer bus 610. The current register file 602 transfers data and ECC data to the error correction circuit 606 via the transfer bus 611. The error correction circuit 606 corrects the error generated in the data by using the ECC data, and generates parity data corresponding to right data. Then, the error correction circuit 606 rewrites the data, parity data, and ECC data in the master register file 601 via the transfer buses 615, 616.

FIG. 10 is a timing chart when the error correction circuit 606 finishes the error correction. The error correction circuit 606 corrects the corresponding data by using the ECC data transferred from the current register 602. The error correction circuit 606 rewrites the corrected data in the master register file 601 via the transfer buses 615, 616. In a cycle 805, every correction processing of the register in the current register file 602 is finished. Then, in a cycle 806, the master register file 601 retransmits parity data via the transfer bus 608 and data via the transfer bus 609 to the current register file 602. The parity checker 603 checks that an error is not generated when data is transferred from the master register file 601 to the count register file 602. Then, in a cycle 807, by the instruction execution from the arithmetic control section 706, the current register file 602 transfers data and parity data of an error to the processing unit 605 via the transfer buses 611, 612. The processing unit 605 rewrites the computation result (D+P+E in FIG. 10) in the master register file 601 via the transfer bus 616.

Figure 11:
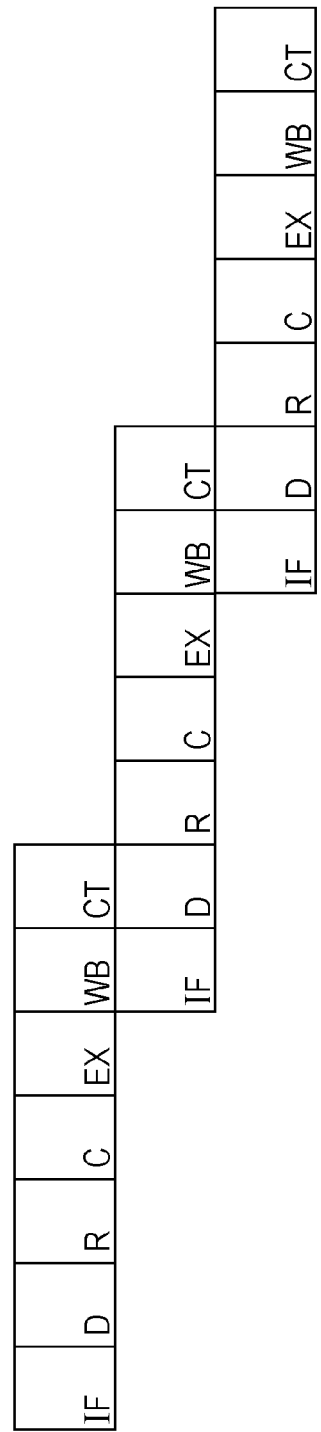
FIG. 11 is a timing chart of a conventional CPU.

FIG. 11 is a timing chart in the case where the error correction processing is taken in one cycle. In the case where there is no error correction processing, each cycle of the operation pipeline includes each stage of instruction fetch (IF), instruction decode (D), register read (R), computing execution (EX), rewrite (WB), and commit (CT). If an error correction processing (C) of one cycle is added to the operation pipeline, a delay time of one cycle is generated to every arithmetic processing with the addition, and the processing performance of the CPU is seriously deteriorated.

The error correcting method in the embodiment is a method for correcting an error generated when a processing of an instruction sequentially provided is executed, and is a method for correcting an error by executing an error detection of data by using data for error check (for example parity data), and by using data for correcting the detected error, the data being different from the data for checking an error (for example, ECC data). Herewith, in the error correcting method in the embodiment, only the minimum delay time that is delayed by correcting an error is generated.

According to the error correcting method of the present invention, by skipping a processing with ECC calculation when error is not detected, a bit error in the register can be corrected without lowering the processing speed of the CPU in the information processing apparatus.

INDUSTRIAL APPLICABILITY

The error correcting method according to the present invention is a method for correcting an error of data generated in a processing of a CPU. Accordingly, the error correcting method according to the present invention is preferably useful in order to provide a CPU which is demanded to process information at a high reliability and a high speed.

All examples and conditional language recited herein are intended for pedagogical purposes to aid the reader in understanding the invention and the concepts contributed by the inventor to furthering the art, and are to be construed as being without limitation to such specifically recited examples and condition, nor does the organization of such examples in the specification relate to a showing of superiority and inferiority of the invention. Although the embodiment of the present inventions have been described in detail, it should be understood that the various changes, substitutions, and alternations could be made hereto without departing from the spirit and scope of the invention.

What is claimed is:

1. A processor to process data and correct an error occurring in the data, the processor comprising:
   a register that stores data with error check data and error correction data in a register;
   an error detector that detects an error in the data stored in a register file of the register by using the error check data; and
   an error corrector that corrects, after transferring data having the error into a different register file, the detected error by using the error correction data and that stores the corrected data read from the different register file back into the register file,
   wherein an arithmetic processing operation is interrupted when the error is detected in the data, and
   wherein the register includes a master register file that stores entire data to be processed in the processor, and the different register file stores partial data including the error data transferred from the register file.

2. The processor according to claim 1, comprising:
   a processing unit that reads data from the register and performs an arithmetic or a logical operation on the data read from the register, and
   wherein when the error detector detects an error in the data, the processing unit waits until the error in the data is corrected by the error corrector and the corrected data is stored back into the register to perform the arithmetic or logical operation.

3. The processor according to claim 2, wherein the error checker detects an error in the data in accordance with an instruction from the processing unit performing the arithmetic or logical operation.

4. The processor according to claim 3, wherein the error detector detects an error in the data generated by the processing unit while performing the arithmetic or logical operation.

5. The processor according to claim 1, wherein the error check data and the error correction data are stored in the register to correspond to the data.

6. The processor according to claim 1, wherein when the error detector detects an error in the data, the error corrector reads the error correction data from the register, and reads again the data from the register in which the error is detected.

7. The processor according to claim 1, wherein the error detector detects an error in the data by operating exclusive OR of the data and the error check data.

8. The processor according to claim 1, wherein the error corrector generates a syndrome for obtaining a position of an error bit in the data by using the error correction data and corrects the error by using the generated syndrome.

9. The processor according to claim 1, wherein the error check data is transmitted from the register through a signal line and the error correction data is transferred from the register through the signal line by switching from the error check data.

10. The processor according to claim 1, comprising:
    an error correction data generator that generates another error correction data corresponding to the data in which the error detector have detected the error.

11. The processor according to claim 1, wherein the error detector sets or resets an error flag in accordance with the error detection, and the error corrector determines by the error flag whether the error detector detects the error.

12. The processor according to claim 1, wherein the error detector detects an error in the partial data transferred from the master register file to the current register file.

13. An error correcting method correcting an error occurring in data, comprising:
    storing data, error check data and error correction data in a register mounted on a processor;
    detecting an error in the data stored in a register file of the register by using the error check data;
    correcting, after transferring data having the error into a different register file holding partial data read from the register including the data having the error, the detected error by using the error correction data; and
    storing the corrected data read from the different register file back into the register file.

14. The error correcting method according to claim 13, comprising:
    reading data from the register; and performing an arithmetic or a logical operation on the data read by the reading, wherein when the detecting detects the error in the data, the performing is performed after the error in the data is corrected by the correcting and the corrected data is stored back into the register by the storing.

15. The error correcting method according to claim 13, comprising:

reading the error correction data from the register when the detecting detects the error in the data; and reading again the data from the register in which the error is detected by the detecting.

16. The error correcting method according to claim 13, comprising:

generating a syndrome for obtaining a position of an error bit in the data by using the error correction data, wherein the correcting corrects the error by using the syndrome generated by the generating.

17. The error correcting method according to claim 13, comprising:

generating another error correction data corresponding to the data in which the detecting has detected the error.

18. An error correcting method correcting an error occurring in data, comprising:

storing data, error check data and error correction data in a register mounted on a processor, the register including a master register file that stores entire data to be processed in the processor, and a current register file that stores partial data including the error data transferred from the master register file;

detecting an error in the data stored in a register file of the register by using the error check data;

correcting, including after transferring data having the error into the current register file, the detected error by using the error correction data; and storing the corrected data read from the current register file back into the master register file.

19. The error correcting method according to claim 18, wherein the detecting detects an error in the partial data transferred from the master register file to the current register file.

* * * * *